United States Patent
Koll et al.

(10) Patent No.: US 7,443,411 B2
(45) Date of Patent: Oct. 28, 2008

(54) TRANSITIONING BETWEEN CONSECUTIVE TRACKS WHEN WRITING A LABEL TO A DISC

(75) Inventors: Andrew Koll, Albany, OR (US); Michael Salko, Eugene, OR (US); Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 10/898,391

(22) Filed: Jul. 24, 2004

(65) Prior Publication Data

US 2006/0017793 A1    Jan. 26, 2006

(51) Int. Cl.
G01D 15/14 (2006.01)
B41J 2/01 (2006.01)

(52) U.S. Cl. ...................... 347/225; 347/101
(58) Field of Classification Search ................. 347/225, 347/2, 101; 369/273, 44.27, 275.3, 53.29; 358/1.15
See application file for complete search history.

(56) References Cited

U.S. PATENT DOCUMENTS

| | | | |
|---|---|---|---|
| 4,967,286 A | 10/1990 | Nomula et al. | |
| 5,084,127 A | 1/1992 | Nakamura | |
| 5,134,602 A * | 7/1992 | Baca et al. | 369/44.27 |
| 5,509,991 A | 4/1996 | Choi | |
| 5,518,325 A | 5/1996 | Kahle | |
| 5,649,380 A | 7/1997 | Zhang | |
| 5,806,222 A | 9/1998 | Shaffer | |
| 6,019,151 A | 2/2000 | Wen et al. | |
| 6,189,590 B1 | 2/2001 | Tsay | |
| 6,240,990 B1 | 6/2001 | Claussnitzer | |
| 6,287,661 B1 | 9/2001 | Shigetomi et al. | |
| 6,302,176 B1 | 10/2001 | Chen | |
| 6,362,130 B1 | 3/2002 | Hotta et al. | |
| 6,384,929 B1 * | 5/2002 | Miller | 358/1.15 |
| 6,403,191 B1 | 6/2002 | Casagrande | |
| 6,508,914 B1 | 1/2003 | Schwaller et al. | |

(Continued)

FOREIGN PATENT DOCUMENTS

EP    1110740 A1 *    6/2001

(Continued)

OTHER PUBLICATIONS

International Search Report for PCT Patent Application No. PCT/US2005/023877 filed Jul. 5, 2005. Report issued Nov. 25, 2005.

(Continued)

*Primary Examiner*—Stephen D Meier
*Assistant Examiner*—Carlos A Martinez, Jr.

(57) ABSTRACT

In various embodiments, an optical disc drive, programs embodiment in computer readable media, and related methods for writing a label to an optical disc using an optical disc drive. In one embodiment, a label is written on the optical disc, the label being embodied in a plurality of tracks that are written onto a surface of the optical disc. A delay is imposed between the writing of consecutive ones of the tracks in the optical disc drive. The length of the delay is determined in part by a length of time it takes to transition from a completion of a first one of the tracks to a starting position to write a next consecutive one of the tracks.

32 Claims, 4 Drawing Sheets

U.S. PATENT DOCUMENTS

| | | |
|---|---|---|
| 6,511,731 B2 | 1/2003 | Clark |
| 6,612,355 B1 | 9/2003 | Cook et al. |
| 6,678,235 B1 * | 1/2004 | Watanabe ................ 369/275.3 |
| 2002/0191517 A1 * | 12/2002 | Honda et al. ............. 369/53.29 |
| 2003/0179679 A1 * | 9/2003 | Morishima .................. 369/108 |
| 2004/0095866 A1 * | 5/2004 | Morishima et al. ....... 369/59.24 |
| 2004/0114500 A1 * | 6/2004 | McClellan et al. .......... 369/273 |
| 2005/0057639 A1 * | 3/2005 | Van Brocklin et al. ...... 347/225 |
| 2006/0017754 A1 * | 1/2006 | Kwasny et al. ................. 347/2 |

FOREIGN PATENT DOCUMENTS

| | | |
|---|---|---|
| EP | 1429319 A | 6/2004 |
| EP | 1439537 A | 7/2004 |
| WO | WO 2004/042729 A | 5/2004 |

OTHER PUBLICATIONS

McClellan et al., U.S. Appl. No. 10/423,366, filed on Apr. 23, 2003. (Related Application).

* cited by examiner

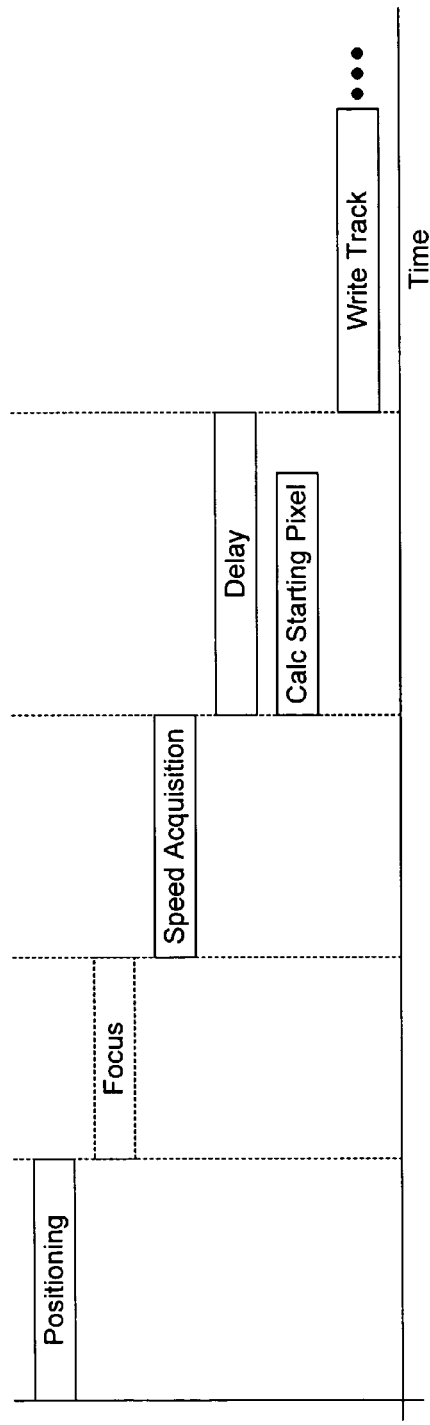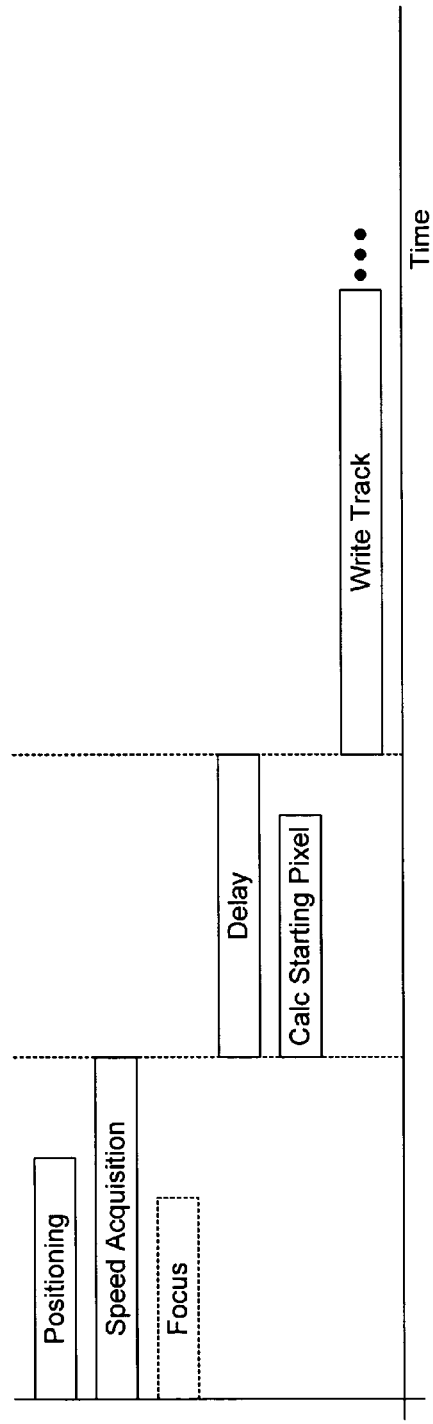

TRANSITIONING BETWEEN CONSECUTIVE TRACKS WHEN WRITING A LABEL TO A DISC

BACKGROUND

Labels embodied in a number of tracks may be written to optical discs. The label is written to the disc one track at a time. In order to provide for transition between tracks, a host that generates the track data may be employed to estimate the delays incurred during the transition and format the data appropriately so that the data is available when the optical disc drive is ready to fire a particular track. However, the nature of asynchronous events within a segmented labeling system result in non-deterministic processing delays. Consequently, depending upon the drive processor duty cycle, the drive may take more or less real time to perform any operation. Also, other factors may result in undue delays in writing individual ones of the tracks due to reliance on the host to format the data to account for transitions between tracks.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 3A is a first timing diagram that illustrates the operation of the optical disc drive of FIG. 1 in writing a label to an optical disc according to an embodiment of the present invention;

FIG. 3B is a second timing diagram that illustrates the operation of the optical disc drive of FIG. 1 in writing a label to an optical disc according to an embodiment of the present invention.

DETAILED DESCRIPTION

Figure 1:
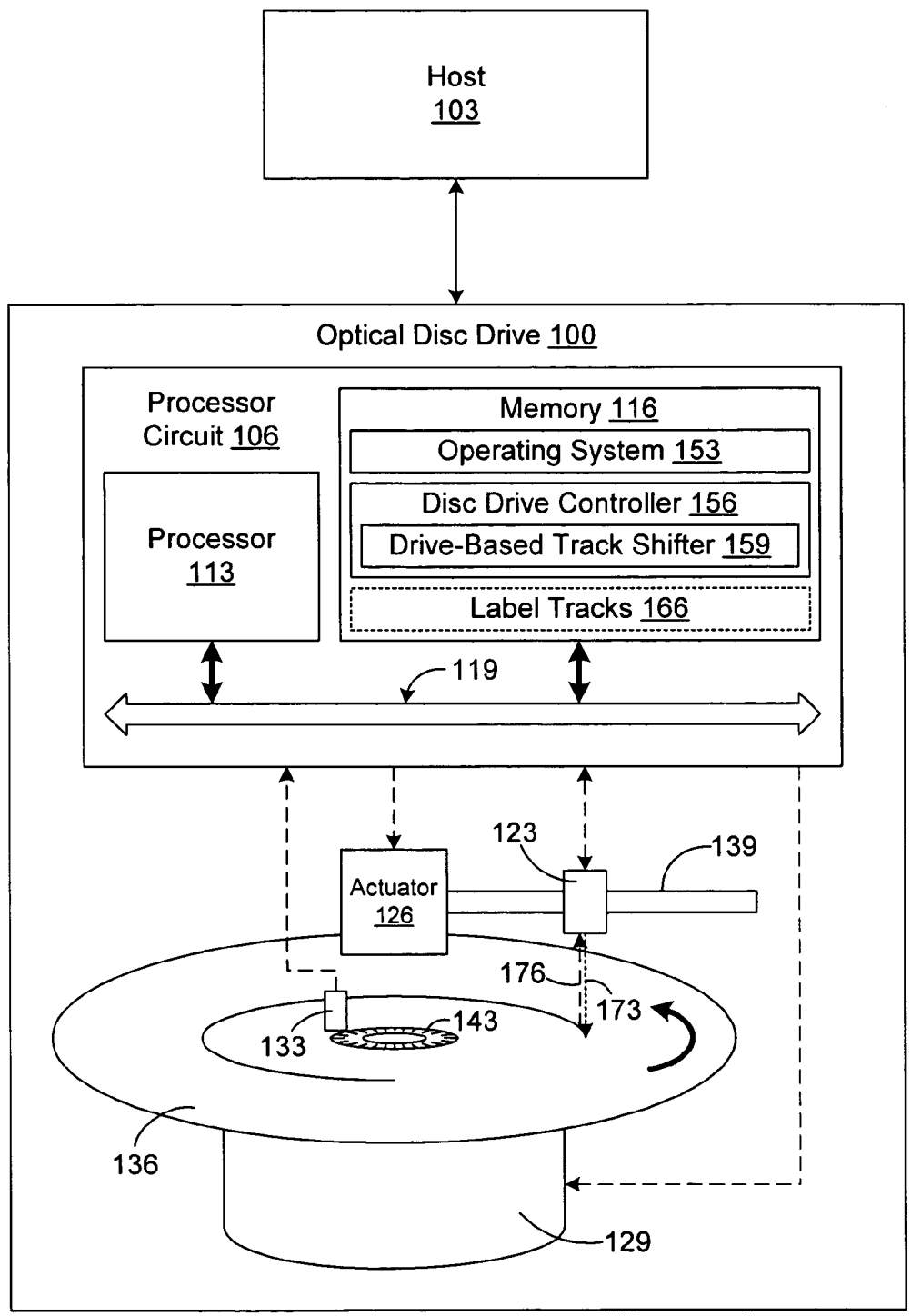
FIG. 1 is a block diagram that illustrates an optical disc drive that facilitates track shifting according to an embodiment of the present invention.

With reference to FIG. 1, shown is an optical disc drive 100 according to an embodiment of the present invention. The optical disc drive 100 is in data communication with a host 103. In this respect, the host 103 may be, for example, a computer system, server, or other similar device. For the purposes of the following discussion, first the structural aspects of the optical disc drive 100 are discussed followed by a discussion of the operation thereof.

The optical disc drive 100 includes a processor circuit 106. The processor circuit comprises a processor 113 and a memory 116, both of which are coupled to a local interface 119. In this respect, the local interface 119 may be, for example, a data bus with an accompanying control/address bus as can be appreciated by those with ordinary skill in the art. The optical disc drive 100 further includes an optical pickup unit 123, an actuator 126, a spindle 129, and a sensor 133. When in use, an optical disc 136 is placed on the spindle 129 as shown. The optical pickup unit 123, actuator 126, spindle 129, and sensor 133 are all operatively or electrically coupled to the processor circuit 106. In particular, these components are coupled to the processor circuit 106 by way of an electrical connection through which electrical signals may be received from or transmitted by the processor circuit 106 in orchestrating the operation of the optical disc drive 100 as will be described.

The actuator 126 may comprise, for example, a stepper motor or other such device. The actuator is operatively coupled to the optical pickup unit 123, for example, using a screw shaft 139. In this respect, the actuator 126 may be manipulated by the processor circuit 106 in order to move the optical pickup unit 123 back and forth along the length of the screw shaft 139 during the normal operation of the optical disc drive 100 as will be described. In this respect, the actuator 126 positions the optical pickup unit 123 relative to the optical disc 136 during the normal course of operation of the optical disc drive 100 as will be described.

The optical pickup unit 123 includes a laser that may be employed to read data from the optical disc 136. In this respect, the optical pickup unit 123 causes the laser to generate laser light 173 that is directed to the optical disc 136. Data structures are embodied in the optical disc 136 that cause the laser light to be reflected or scattered to indicate data values as can be appreciated by those with ordinary skill in the art. To detect reflected laser light 176, the optical pickup unit 123 includes a sensor that receives the reflected laser light during the read operation. The optical pickup unit 123 may be manipulated to write data to the optical disc 136 by controlling a laser in the optical pickup unit 123 so as to form the data structures in the optical disc. According to the various embodiments of the present invention, the writing capabilities of the optical disc drive 100 are employed to write a label on a surface of the optical disc 136.

The spindle 129 comprises a motor or other such device that spins the optical disc 136. This motor may be, for example, a stepper motor or other type of motor. In this respect, the optical disc 136 is placed in a seating position relative to the spindle 129. Thereafter, the optical disc 136 may be spun relative to the optical pickup unit 123 and the sensor 133. The sensor 133 obtains positional data 143 from the optical disc 136 as it rotates on the spindle 129.

The optical disc drive 100 further comprises a number of components stored in the memory 116 and executable by the processor 113 in order to orchestrate the operation of the various components of the optical disc drive 100 in order to write a label onto a surface of the optical disc 136. These components comprise, for example, an operating system 153 and a disc drive controller 156. The disc drive controller 156 is executed by the processor 113 to control the various operations of the optical disc drive 100. In this respect, the disc drive controller 156 orchestrates the general operation of the optical disc drive 100 in writing to and reading from optical discs 136. The disc drive controller 156 also orchestrates the operation of the optical disc drive 100 in writing a label on a surface of an optical disc 136.

To facilitate the writing of the label on the optical disc 136, the disc drive controller 156 includes a drive-based track shifter 159. The drive-based track shifter 159 is the portion of the disc drive controller 156 that is executed during a writing of a label onto a surface of the optical disc 136 to accomplish track shifting as will be described. In addition, other logic inherent within the disc drive controller 156 may be executed during the execution of the drive-based track shifter 159.

In addition, temporarily stored within the memory 116 are label tracks 166. In this respect, the label written to the surface of the optical disc 136 is embodied in a number of circular tracks as will be described.

The memory 116 may comprise, for example, random access memory (RAM), such as, for example, static random access memory (SRAM), dynamic random access memory (DRAM), or magnetic random access memory (MRAM) and other such devices. In addition, the memory 116 may also include read-only memory (ROM) such as a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be of electrical, optical, or molecular construction, or of some other construction as can be appreciated by those with ordinary skill in the art.

The operating system 153 is executed to control the allocation and usage of hardware resources such as the memory, processing time and peripheral devices in the optical disc drive 100. In this manner, the operating system 153 serves as the foundation on which applications depend as is generally known by those with ordinary skill in the art.

Next, the general operation of the optical disc drive 100 in writing a label to an optical disc 136 is described according to an embodiment of the present invention. The disc drive controller 156 orchestrates the operation of the various components of the optical disc drive 100 in order to write a label onto the surface of the optical disc 136. The disc drive controller 156 also orchestrates the operation of the various components of the optical disc drive 100 when writing data to and reading data from the optical disc 136. However, discussion of the writing and reading tasks are not described herein in detail.

To the extent that the disc drive controller 156 orchestrates the operation of the various components of the optical disc drive 100 in order to write a label onto the surface of the optical disc 136, it controls the movement of the optical pickup unit 123 by manipulating the actuator 126 to cause the optical pickup unit 123 to move along the screw shaft. In addition, the disc drive controller 156 controls the rotation of the optical disc 136 by controlling the speed of the spindle 129. In this respect, the spindle 129 may comprise, for example, a stepper motor or other motor that causes the optical disc 136 to spin as desired. Also, the disc drive controller 156 can control the read and write functions of the optical disc drive 100 by manipulating the optical pickup unit 123 to transmit laser light 173 to the disc. When the optical pickup unit 123 is reading data from the disc, then the reflected laser light 176 is sensed by the optical pickup unit 123 and applied to the optical disc drive 100.

In addition, the disc drive controller 156 causes the optical pickup unit 123 to focus the laser 173 as it is directed at the optical disc 136. In this respect, the focusing function may be performed continuously while the optical disc 136 spins and the laser 173 is directed thereto during the performance of label writing functions, etc. Alternatively, the focusing may be performed periodically at predefined times during the course of the label writing function as will be described.

The disc drive controller 156 also tracks the position of the optical disc 136 based upon inputs from the sensor 133. In particular, the sensor 133 senses the passing of spokes 143 disposed on the optical disc 136 near the center, although the spokes may be located at some other position on the optical disc 136. Each time a spoke 143 passes the sensor 133, the sensor 133 generates a pulse that is received by the disc drive controller 156 by way of the local interface 119. In this respect, each pulse may be viewed as a signal or an interrupt that informs the disc drive controller 156 of a component rotation of the optical disc 136. To track the actual location of the optical disc 136 based upon the pulses, the disc drive controller 156 typically includes a counter that counts the pulses up to a total number of pulses in a single rotation to determine the actual position of the optical disc 136 at a given time.

Thus, the location of the laser beam generated by the optical pickup unit 123 relative to the optical disc 136 may be calculated based upon the positional data tracked by the disc drive controller 156 based upon the data generated by the sensor 133. In particular, the location of the optical pickup unit 123 relative to a predefined position on the optical disc 136 of each pixel of the label that is to be written to the optical disc 136 may be calculated based upon the relative positions of each of the spokes 143 sensed by the sensor 133.

By virtue of the above-mentioned components, the disc label controller 153 orchestrates the writing of a label on a surface of the optical disc 136. The surface of the optical disc 136 that is to receive the label is chemically treated so as to change color upon being irradiated with laser light from the optical pickup unit 123. Such treatment includes, for example, a coating of thermochromic material that has been screen-printed on the label surface such that this material changes from light to dark color when activated by the laser. This label material may vary from manufacturer to manufacturer, or from one disc type to another disk type. As a consequence, the appearance of the generated label may vary accordingly.

The label to be written to the circular optical disc 136 is embodied in the form of radial data that comprises a number of concentric and adjacent circular tracks. The disc drive controller 156 orchestrates the writing of a single track at a time. In one embodiment, the first track to be written is the inner-most track of the optical disc 136. From there, each track is written from the inside out. Alternatively, the optical disc 136 may be written from the outer-most track to the inner-most track.

When writing the label to the optical disc 136 each track is received from the host 103 and temporarily stored in the memory 116 as label tracks 166. In some embodiments, the memory 116 may not be large enough to accommodate all of the tracks of the label that is written to the surface of the optical disc 136. Consequently, the host 103 transmits the tracks to the optical disc drive 100 for temporary storage as label tracks 166 on the memory 116. The rate at which the tracks are transmitted is chosen so as to maintain a minimum number of label tracks 166 on the memory 116 at all times during a label writing operation so that the appropriate number of label tracks 166 are always present within the memory 116 when they are needed for labeling the optical disc 136.

With regard to the disc drive controller 156 directing the writing of a single track at a time, the drive-based track shifter 159 orchestrates a transition of the optical pickup unit 123 between consecutive tracks until the last track is written to the optical disc 136. The term "consecutive" as employed herein is defined as the relationship between two tracks that are written to the optical disc 136 as a part of the entire label. In this respect, the consecutive tracks may or may not be directly adjacent to each other. Specifically, from time to time it may be the case that some of the tracks within a particular label are entirely blank. Consequently, when writing the label on the optical disc 136, these tracks may be skipped. Thus, the "next consecutive track" is the next track to which a portion of the label is to be written relative to a current track that is being written that comprise another portion of the label, regardless of whether intermediate tracks are skipped.

When the optical pickup unit 123 has successfully moved from a completed track to the next consecutive track and has completed various track transition tasks as will be described, then the drive-based track shifter 159 determines a starting pixel at which the writing of the next consecutive track is started as will be described. In this respect, the data representing the next consecutive track is accessed from the memory 116 and starting pixel determined therein.

When writing the label to the optical disc 136, the drive-based track shifter 159 prevents the starting pixel of each track that is written to the optical disc 136 from falling on the same angular position on the optical disc 136. This angular displacement is referred to as track shifting. This is due to the fact that the length of the circumference of a given track may not equal the total length of an integer number of adjacent pixels to be written onto the disc. As such, a small gap that is less than the width of a single pixel may exist between the starting pixel of a given track and the last written pixel of the same track. If the starting pixels of each of the track were lined up at the same angular position, then a visible line created by the "lined up" gaps may result from the center to the outer periphery of the optical disc 136, thus adversely affecting the image quality of the resulting label.

To prevent such an occurrence, the present invention provides for track shifting that may or may not be randomized. In this respect, when the tracks are written to the optical disc 136, the starting pixels of each track are located at different angular positions with respect to each other. In order to ensure that the starting pixels of each track are located at different angular positions with respect to each other, a delay is imposed that allows the disc 136 to spin a resulting angle between the writing of consecutive ones of the tracks. The length of the delay is determined in part by a length of time that it takes to transition from a completion of a given one of the tracks to the starting position at which to write the next consecutive one of the tracks. The starting position is the position within a given track at which the starting pixel is located and is where the writing of the track commences.

The length of time that it takes to transition from the completion of a given one of the tracks to the starting position of the next consecutive one of the tracks is determined in part by the length of time it takes to perform a number of track transition tasks to transition from the completion of the given one of the tracks to the starting position of the next consecutive track. The track transition tasks may comprise, for example, a positioning of the optical pickup unit 123 from the given one of the tracks to the next consecutive one of the tracks. Also, the track transition tasks may comprise the acquisition of a rotational speed of the optical disc 136 at the next consecutive one of the tracks to be written. The acquisition of the rotational speed of the optical disc 136 refers to determining the speed of the optical disc 136 at the current track based upon the disc positional data obtained from the sensor 133.

In addition, in some situations another track transition task may include the task of focusing the optical pickup unit 123 relative to the optical disc 136. Such is not the case when the focusing of the optical pickup unit 123 is continuously performed by a subroutine within the disc drive controller 156. In such a situation, the focusing is performed continuously rather than as a track transition task and is not related to the function of the drive-based track shifter 159. As such, the focusing is not considered one of the track transition tasks and does not affect the length of the delay imposed between the writing of consecutive ones of the tracks.

However, focusing is considered to be a track transition task when the optical pickup unit 123 is focused periodically a predefined times. In this respect, the focusing operation is performed along with the positioning and speed acquisition tasks as one of the track transition tasks. The focusing task may be performed during each transition between consecutive ones of the tracks or the focusing operation may be performed periodically during select ones of the transitions between consecutive ones of the tracks, thereby skipping over several transitions between consecutive ones of the tracks as is needed.

In addition, the track transition tasks may be performed either serially or in parallel. When the track transition tasks are performed serially, each task is performed one at a time or individually without overlap in time. When performed in parallel, the track transition tasks are performed concurrently. Thus, when the track transition tasks are performed in parallel, the length of the delay imposed between the writing of the consecutive ones of the tracks may depend upon the track transition task that is longest. Note that the length of the delay imposed may vary due to the fact that the time it takes to perform the track transition tasks may vary.

When the track transition tasks are completed, the optical pickup unit 123 is thus placed in a state of readiness to write the track onto the optical disc 136. At this point, the data representing the label is obtained starting with the starting pixel and applied to the optical pickup unit 123. To allot sufficient time to identify the data corresponding to the starting pixel, an additional delay is imposed before the optical pickup unit 123 reaches the starting position where writing of the track commences at the starting pixel. This delay is imposed when the track transition tasks are completed so as to provide for time to identify the point in the label track 166 stored in the memory 116 that corresponds to the starting pixel in the label track 166. Also, this delay provides for time to obtain the track data corresponding to the starting pixel from the memory 116 to be applied to the optical pickup unit 123 to begin the writing of the next consecutive one of the tracks.

Thus, the total delay imposed between the writing of consecutive ones of the tracks depends in part upon the length of the time it takes to complete the track transition tasks that are to be performed, plus the delay imposed to look up the data that corresponds to the starting pixel and apply the same to the optical pickup unit 123. The total delay varies as the length of time it takes to perform the track transition tasks may vary from track to track. Specifically, due to the fact that consecutive tracks are of different radius, it may take greater or lesser amounts of time to reposition the optical pickup unit 123 and to acquire the speed of the optical disc 136 at the next consecutive track accordingly. Alternatively, the time of the delay imposed after the track transition tasks are completed may be randomly varied or randomized, provided that such time periods are at least greater than a minimum length of time necessary to lookup the data at the starting pixel and apply the same to the optical pickup unit 123.

In addition, the label tracks 166 stored in the memory 116 may be arranged in a byte-wise arrangement or some other data arrangement. To say that the data is arranged in a byte-wise arrangement means that the data is grouped according to bytes having 8 bits. In one embodiment, the track data is obtained from the memory 116 and applied to the optical pickup unit 123 a byte at a time. If the starting pixel falls within the middle of a given byte, then the whole byte is applied to the optical pickup unit 123 and the bit that corresponds to the starting pixel is noted within the byte so that the writing of the track begins therewith.

Figure 2A:
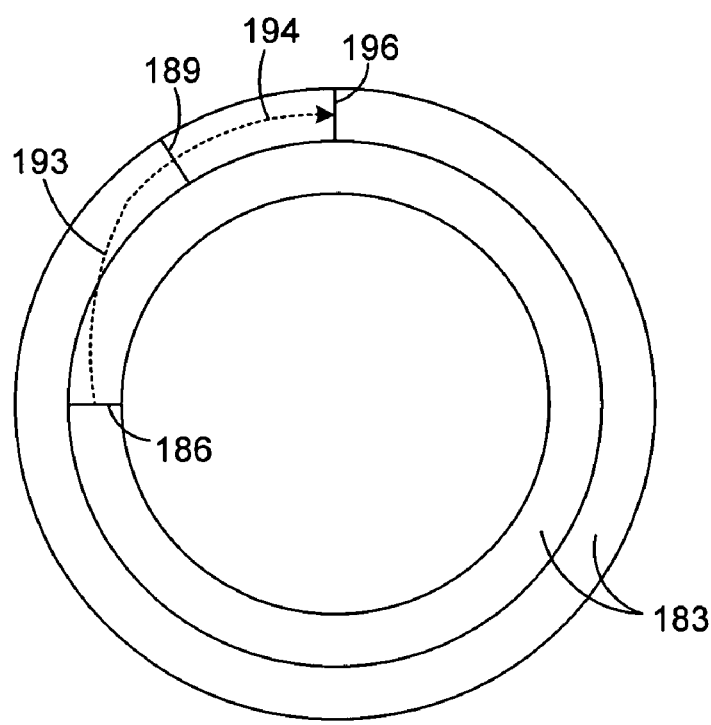
FIGS. 2A and 2B are drawings of consecutive tracks that illustrate a pathway of an optical pickup unit in the optical disc drive of FIG. 1 according to an embodiment of the present invention.

Turning then to FIG. 2A, shown is an example of a pair of tracks 183 according to an embodiment of the present invention. The tracks 183 are consecutive in that a transition is performed from the completion of the inner one of tracks to the starting position of the next consecutive (outer) one of the tracks as shown. In this example, the tracks are also adjacent, although in other situations this may not be the case. The inner one of the tracks includes an ending point 186 which is the position at which the writing of such track has been completed. Thereafter, the disc drive controller 156 (FIG. 1) manipulates the actuator 126 (FIG. 1) to move the optical pickup unit 123 (FIG. 1) to be centered at the next consecutive track while the optical disc 136 is rotated. Also, any other track transition tasks are performed either serially or in parallel with the repositioning of the optical pickup unit 123. Due to the repositioning of the optical pickup unit 123 and the performance of any other track transition task(s), the optical pickup unit 123 is ultimately aimed at an intermediate point 189 when the track transition tasks are complete. Thus, the intermediate position is that position on the next consecutive track 183 at which each of the track transition tasks have been completed. The transition tasks include, for example, a repositioning 193 of the optical pickup unit 123, reacquiring the speed of the optical disc 136 at the track to be written, or focusing the optical pickup unit, etc.

Thereafter, the optical pickup unit 123 progresses along the next consecutive one of the tracks 183 until it reaches the starting position 196 at which the starting pixel is located. The path at which the optical pickup unit 123 progresses along the second consecutive track 183 is that which is traveled during the delay 194 that occurs after the track transition tasks are complete as discussed above.

Figure 2B:
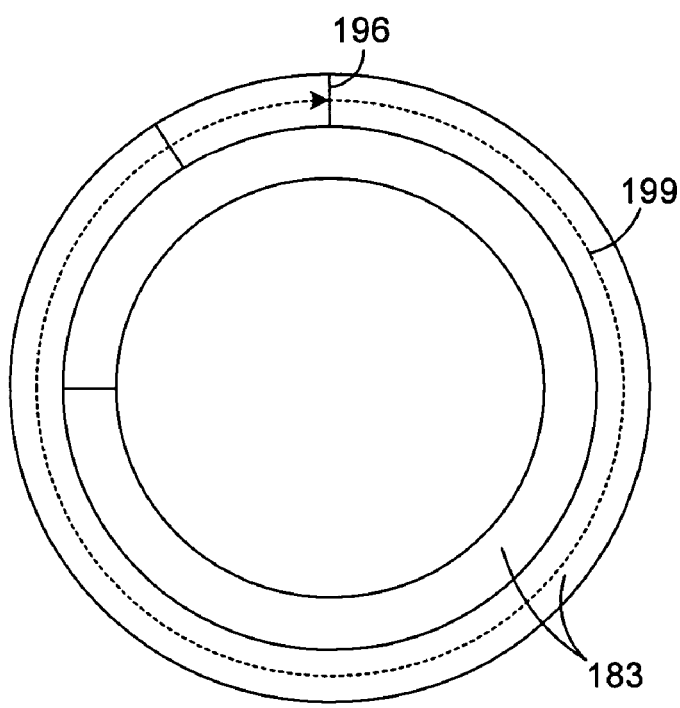

With reference to FIG. 2B, shown is the track writing operation 199 performed with respect to the next consecutive track after the transition from the inner track is complete and the optical disc 136 is positioned so that the optical pickup unit 123 is pointed at the starting pixel. In this respect, the track writing operation 199 starts and ends at the beginning position 196. Note that when the track writing operation 199 ends, the trailing edge of the last pixel may not line up perfectly with the beginning edge of the starting pixel. This is due to the fact that the length of the track 183 may not be equal to an integer number of the widths of the pixels as described above.

With reference then to FIG. 3A, shown is a timing diagram that illustrates the performance of the time of a transition from the completion of a first one of the tracks to the starting position to write the next consecutive one of the tracks that may occur between the writing of any two consecutive tracks of a given label. With reference to FIG. 3A, shown is a timing diagram of a serial transition in which the track transition tasks are performed serially. Specifically, to begin, the optical pickup unit 123 is repositioned from the completed track to the next consecutive track to be written. After the optical pickup unit 123 has been repositioned, then next the focusing transition task is performed if necessary as described above.

Once the focusing has been completed, then the speed acquisition task is performed in which the speed of the optical disc 136 at the current track is determined. Thereafter, a delay is imposed while, at the same time, the starting pixel is calculated. In this respect, the delay may be, for example, the amount of time necessary to rotate the disc an integer number of bytes of pixels relative to the optical pickup unit 123. For example, the delay may encompass 3 bytes that includes data for 24 pixels.

In any event, the delay at this point is specified so as to be long enough to allow the drive-based track shifter 159 to calculate the starting pixel and to obtain the data corresponding with the starting pixel from the memory 116 (FIG. 1) to be applied to the optical pickup unit 123. Once the starting pixel has been determined and obtained from the memory 116, then the disc drive controller 156 commences writing the track.

With reference to FIG. 3B, shown is a parallel transition in which the track transition tasks are performed in parallel. Specifically, the repositioning of the optical pickup unit 123, the speed acquisition, and any focusing, if necessary, are performed in parallel or concurrently. Thus, the longest one of these tasks dictates the time period necessary to perform the track transition tasks themselves. As shown, the speed acquisition task is the longest, however, the repositioning task or the focusing task may be longer than the speed acquisition in some instances where, for example, many tracks must be skipped over to be repositioned to the next consecutive track to be written. Once the track transition tasks are completed in parallel, then the same delay is imposed to calculate and obtain the data corresponding to the starting pixel in a manner similar as discussed above with reference to FIG. 3A. Alternatively, as described above, this delay may be randomly varied as well. Thereafter, the track is written to the disc.

Figure 4:
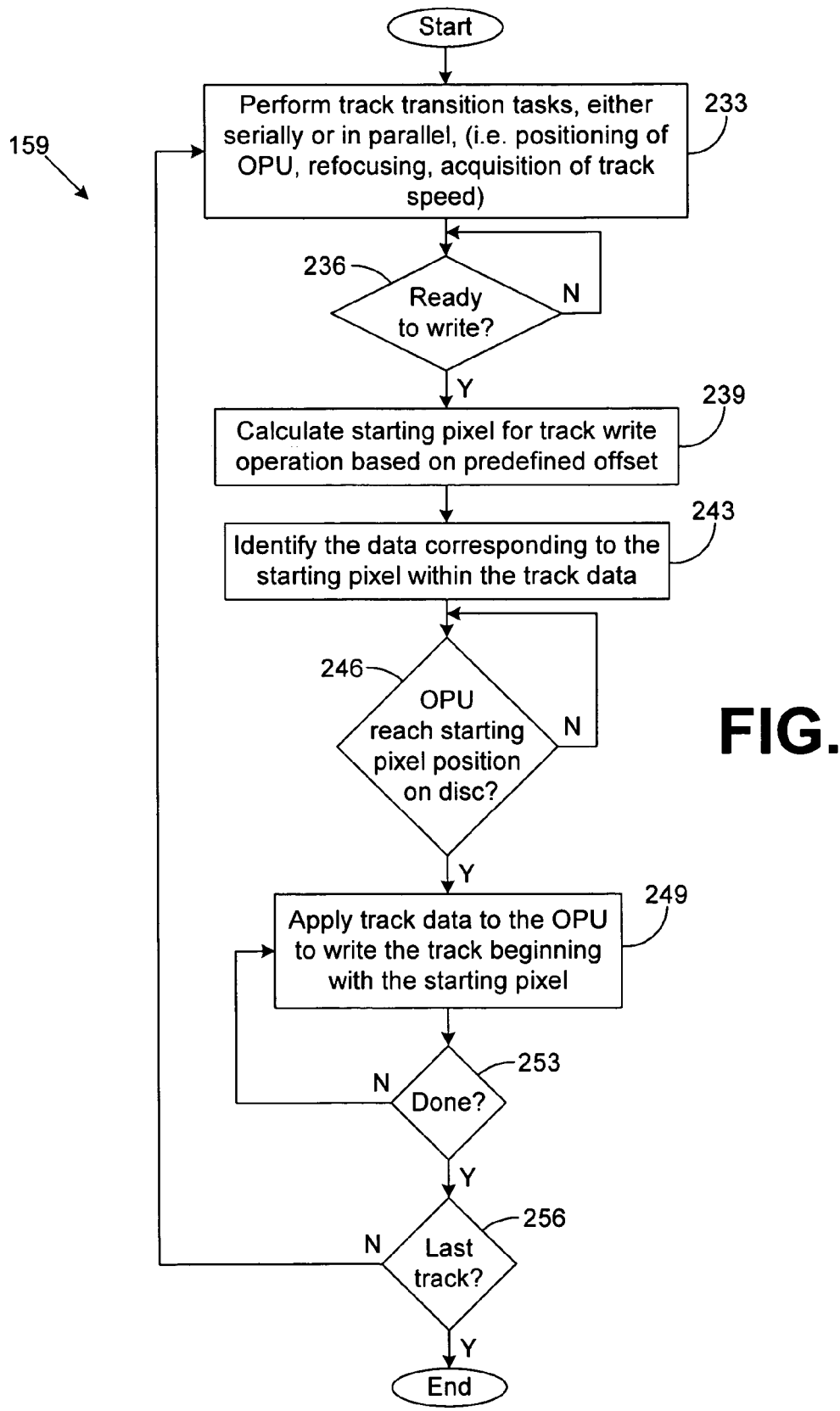
FIG. 4 is a flow chart that illustrates one example of the operation of a drive-based track shifter 159 executed in the optical disc drive of FIG. 1 to write a label to a disc according to an embodiment of the present invention.

Referring next to FIG. 4, shown is a flow chart that provides one example of the operation of the drive-based track shifter 159 that is executed as a portion of the disc drive controller 156 (FIG. 1) to accomplish drive-based track shifting according to an embodiment of the present invention. Alternatively, the flow chart of FIG. 4 may be viewed as depicting steps of an example of a method implemented in the optical disc drive 100 (FIG. 1) to accomplish a drive-based track shifting. The functionality of the drive-based track shifter 159 as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The drive-based track shifter 159 may be implemented using any one of a number of programming languages such as, for example, C, C++, Assembly, or other programming languages.

Beginning with box 233, all track transition tasks are performed either serially or in parallel. These tasks may comprise, for example, positioning of the optical pickup unit 123 (FIG. 1), refocusing, acquisition of the speed of the optical disc 136 at the current track to be written, or other tasks. Thereafter, in box 236, the drive-based track shifter 159 determines whether the track transition tasks have been completed such that the optical pickup unit 123 has reached a state of readiness to write the track.

If such is the case, then the drive-based track shifter 159 proceeds to box 239 in which the starting pixel for the current track is calculated or otherwise identified. In this respect, the starting pixel is calculated as a predefined offset of pixels relative to the current position of the optical pickup unit 123 just after the track transition tasks have been completed, where the pixels are passed over due to the rotation of the optical disc 136 during the delay. The calculation of the starting pixel involves calculating the location of the starting pixel in the corresponding track data 166 based upon the locations of the spokes 143 (FIG. 1) detected by the sensor 133 (FIG. 1). By calculating the starting pixel as such, the above-mentioned delay is imposed after the track transition tasks are complete, but before the writing of the track begins as was described above.

Thereafter, in box 243, the drive-based track shifter 159 identifies and obtains the data corresponding to the starting pixel within the label track 166 to be written. Thereafter, in box 246, the drive-based track shifter 159 waits until the starting position of the starting pixel on the optical disc 136 reaches the optical pickup unit 123. This occurs, for example, at the end of the delay imposed after the track transition tasks are complete. Thereafter, in box 249, the drive-based track shifter 159 applies the track data to the optical pickup unit 123 to drive the laser in the optical pickup unit 123 to write the track beginning with the starting pixel. Thereafter, in box 253, the drive-based track shifter 159 determines whether the writing of the current track is complete. If not, then the drive-based track shifter 159 stays in a loop of blocks 253 and 249 until the writing of the track is complete. Assuming that the writing of the track is complete in box 256, then the drive-based track shifter 159 progresses to box 256 in which it is determined whether the last track has been written on the optical disc 136. If not, then the drive-based track shifter 159 reverts back to box 233 in order to proceed to the next consecutive track to be written. Otherwise, the drive-based track shifter 159 ends.

Although the drive-based track shifter 159 is embodied in software or code executed by hardware as discussed above, as an alternative the drive-based track shifter 159 may also be embodied in dedicated hardware or a combination of software/general purpose hardware and dedicated hardware. If embodied in dedicated hardware, the drive-based track shifter 159 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 4 shows the architecture, functionality, and operation of an implementation of the drive-based track shifter 159. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, or messages might be added to the logical flow described herein, for purposes of enhanced utility, accounting, performance measurement, or providing troubleshooting aids, etc. It is understood that all such variations are within the scope of the present invention.

Also, where the drive-based track shifter 159 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the drive-based track shifter 159 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for writing a label to an optical disc in an optical disc drive, comprising the steps of:

writing a label on the optical disc, the label being embodied in a plurality of tracks that are written onto a surface of the optical disc; and imposing a delay between the writing of consecutive ones of the tracks in the optical disc drive, a length of the delay being determined in part by a length of time it takes to transition from a completion of a first one of the tracks to a starting position to write a next consecutive one of the tracks;

performing a plurality of track transition tasks to transition from the completion of the first one of the tracks to the starting position to write the next consecutive one of the tracks;

imposing a predefined delay after the track transition tasks are completed and before reaching the starting position to write the next consecutive one of the tracks; and determining a starting pixel at which to start the writing of the next consecutive one of the tracks during the predefined delay.

2. The method of claim 1, further comprising the step of varying the length of the delay due to a variation in the length of time it takes to perform the track transition tasks.

3. The method of claim 1, further comprising the step of adding a random additional delay after a completion of the track transition tasks, the length of the delay between the writing of consecutive ones of the tracks in the optical disc drive including the length of the random additional delay.

4. The method of claim 1, wherein the track transition tasks are performed serially.

5. The method of claim 1, wherein the track transition tasks are performed in parallel.

6. The method of claim 1, wherein the step of performing the plurality of track transition tasks further comprises the steps of:
positioning the optical pickup unit to write the next consecutive one of the tracks; and
acquiring a rotational speed of the optical disc.

7. The method of claim 6, wherein the step of performing the plurality of track transition tasks further comprises the step of focusing the optical pickup unit relative to the optical disc.

8. An optical disc drive, comprising:
a spindle for placement and rotation of an optical disc;
an optical pickup unit including a laser for writing an amount of data to a disc;
an actuator to position the optical pickup unit relative to the optical disc;
a sensor operatively coupled to the control system, the sensor being configured to obtain positional data from the optical disc rotating on the spindle; and
a control system operatively coupled to the spindle, the optical pickup unit, and the actuator, the control system controlling the spindle, the optical pickup unit, and the actuator to write a label on the optical disc, the label being embodied in a plurality of tracks that are written onto a surface of the optical disc, the control system imposing a delay between the writing of consecutive ones of the tracks in the optical disc drive, a length of the delay being determined in part by a length of time it takes to transition from a completion of a first one of the tracks to a starting position to write a next consecutive one of the tracks, the control system controlling a plurality of track transition tasks to transition from the completion of the first one of the tracks to the starting position to write the next consecutive one of the tracks, and the control system imposing a predefined delay after the plurality of track transition tasks are completed and before reaching the starting position to write the next consecutive one of the tracks, the control system further looking up a starting pixel of the next consecutive one of the tracks to be written beginning at the starting position during the predefined delay.

9. The optical disc drive of claim 8, wherein the track transition tasks are performed serially.

10. The optical disc drive of claim 8, wherein the track transition tasks are performed in parallel.

11. The optical disc drive of claim 8, wherein the track transition tasks further comprise:
positioning the optical pickup unit by manipulating the actuator; and
acquiring a rotational speed of the optical disc based upon the positional data obtained from the sensor.

12. The optical disc drive of claim 11, wherein the track transition tasks further comprise focusing the optical pickup unit relative to the optical disc.

13. An optical disc drive, comprising:
a spindle for placement and rotation of an optical disc;
an optical pickup unit including a laser for writing an amount of data to a disc;
an actuator to position the optical pickup unit relative to the optical disc;
means for controlling the spindle, the optical pickup unit, and the actuator to write a label on the optical disc, the label being embodied in a plurality of tracks that are written onto a surface of the optical disc, wherein a delay is imposed between the writing of consecutive ones of the tracks in the optical disc drive, a length of the delay being determined in part by a length of time it takes to transition from a completion of a first one of the tracks to a starting position to write a next consecutive one of the tracks, the transition from the completion of the first one of the tracks to the starting position to write the next consecutive one of the tracks including a plurality of track transition tasks, and the means for controlling imposing a predefined delay after the plurality of track transition tasks are completed and before reaching the starting position to write the next consecutive one of the tracks; and
means for determining a starting pixel at which to start the writing of the next consecutive one of the tracks during the predefined delay.

14. The optical disc drive of claim 13, further comprising a sensor operatively coupled to the means for controlling, the sensor obtains positional data from the optical disc rotating on the spindle.

15. A method for writing a label to an optical disc, comprising the steps of:
performing at least one track transition task to place an optical pickup unit in an optical disc drive in a state of readiness to write a track onto the optical disc, wherein the track is a portion of the label to be written on a surface of the optical disc;
imposing a predefined delay after completion of the at least one track transition task and before reaching a starting position to write the track;
identifying a starting pixel at which to start the writing of the track to be written to the optical disc during the predefined delay; and
writing the portion of the label onto the optical disc by writing the track to the optical disc beginning with the starting pixel.

16. The method of claim 15, wherein the step of performing at least one track transition task further comprises the step of positioning the optical pickup unit to write the track onto the optical disc.

17. The method of claim 15, wherein the step of performing at least one track transition task further comprises the step of acquiring a rotational speed of the optical disc.

18. The method of claim 15, wherein the step of performing at least one track transition task further comprises the step of focusing the optical pickup unit relative to the optical disc.

19. The method of claim 15, wherein the step of identifying the starting pixel in the track further comprises the step of calculating the starting pixel offset by a predefined number of pixels relative to a position of the optical pickup unit upon reaching the state of readiness.

20. The method of claim 15, further comprising the step of identifying an amount of data stored in a memory in the optical disc drive corresponding to the starting pixel.

21. The method of claim 15, wherein the step of performing at least one track transition task further comprises the step of concurrently positioning the optical pickup unit to write the track onto the optical disc and acquiring a rotational speed of the optical disc.

22. The method of claim 15, wherein the step of performing at least one track transition task further comprises the step of serially positioning the optical pickup unit to write the track onto the optical disc and acquiring a rotational speed of the optical disc.

23. A program embodied in a computer-readable medium for disc drive label writing control, comprising:

code that controls an optical pickup unit in a disc drive to write a label on a surface of an optical disc, the label being embodied in a plurality of tracks that are written onto the surface of the optical disc, the code imposing a delay between the writing of consecutive ones of a plurality of tracks of a label on an optical disc in an optical disc drive, a length of the delay being determined in part by a length of time it takes to transition from a completion of a first one of the tracks to a starting position to write a next consecutive one of the tracks;

code that implements a plurality of track transition tasks to transition from the completion of the first one of the tracks to the starting position to write the next consecutive one of the tracks;

code that imposes a predefined delay after the track transition tasks are completed and before reaching the starting position to write the next consecutive one of the tracks; and code that determines a starting pixel at which to start the writing of the next consecutive one of the tracks during the predefined delay.

24. The program embodied in the computer-readable medium of claim 23, wherein the track transition tasks are performed serially.

25. The program embodied in the computer-readable medium of claim 23, wherein the track transition tasks are performed in parallel.

26. The program embodied in the computer-readable medium of claim 23, wherein the track transition tasks further comprise:

positioning the optical pickup unit by manipulating the actuator; and acquiring a rotational speed of the optical disc based upon the positional data obtained from the sensor.

27. The program embodied in the computer-readable medium of claim 26, wherein the track transition tasks further comprise focusing the optical pickup unit relative to the optical disc.

28. An optical disc having a label written on a surface of the optical disc according to a method comprising:

writing the label on the surface of the optical disc, the label being embodied in a plurality of tracks that are each written onto the surface of the optical disc; and imposing a delay between the writing of consecutive ones of the tracks in the optical disc drive, a length of the delay being determined in part by a length of time it takes to transition from a completion of a first one of the tracks to a starting position to write a next consecutive one of the tracks;

performing a plurality of track transition tasks to transition from the completion of the first one of the tracks to the starting position to write the next consecutive one of the tracks;

imposing a predefined delay after the track transition tasks are completed and before reaching the starting position to write the next consecutive one of the tracks; and determining a starting pixel at which to start the writing of the next consecutive one of the tracks during the predefined delay.

29. The optical disc of claim 28, the method further comprising varying the length of the delay due to a variation in the length of time it takes to perform the track transition tasks.

30. The optical disc of claim 28, the method further comprising adding a random additional delay after a completion of the track transition tasks, the length of the delay between the writing of consecutive ones of the tracks in the optical disc drive including the length of the random additional delay.

31. The optical disc of claim 28, wherein the track transition tasks are performed serially.

32. The optical disc of claim 28, wherein the track transition tasks are performed in parallel.

* * * * *